May 2, 1967     J. S. BRADLEY     3,317,891
RESISTANCE-TYPE LINE DETECTOR
Filed July 8, 1964     2 Sheets-Sheet 1

INVENTOR.
John S. Bradley
BY *Blucher S. Sharp*
Attorney

United States Patent Office 3,317,891
Patented May 2, 1967

3,317,891
RESISTANCE-TYPE LINE DETECTOR
John S. Bradley, Dallas, Tex., assignor to The Atlantic Refining Company, Philadelphia, Pa., a corporation of Pennsylvania
Filed July 8, 1964, Ser. No. 381,054
4 Claims. (Cl. 340—17)

This invention is concerned with an improved type of continuous line detector for seismic prospecting. More particularly, the invention relates to a line seismometer whose operation depends upon seismic vibrations producing detectable changes in resistance to electric flow through resistor elements in the seismometer.

The geophysical method most widely used at present in oil prospecting is the seismic method. This is because it gives rsults that are easiest to translate into geological terms. It is used in reconnaissance or regional surveys and in local surveys to determine the extent and shape of geological features in detail. Also, it can be used for conducting both land and marine surveys.

Seismic prospecting involves initiating a seismic shock at or near the surface of the earth. Seismic waves passing through the earth cause motion of the ground that can be measured and recorded with proper instruments placed on or just below the surface. With this technique, the structure of subsurface formations is mapped by making use of the times required for a seismic wave (or pulse) to return to the surface after underground reflection. Variations in the reflection times from place to place on the surface usually indicate structural features in the rocks below. Depths to reflecting interfaces can be determined from travel times if the velocity of seismic waves in the overlying section is known or can be established from seismic refraction data or the like.

Offshore seismic operations today are continuous. "Microphones" are hauled through the water at a constant speed on a "streamer" at a depth which is kept approximely constant and explosive charges are detonated at appropriate positions relative to the streamer at times determined by the speed of travel. The positioning of the ship on marine surveys is accomplished by employing radio surveying aids such as Decca, Shoran, or Loran techinques.

Instruments for detecting seismic waves are called detectors. The detector, also referred to as a seismometer or geophone, converts the seismic oscillations of the earth into electrical signals. For practical purposes it is considered to move as if it were part of the earth, whether it is buried or just sitting on the surface. These detectors are related to and evolved from instruments originally employed for earthquake detection.

The simplest and by far the most widely used type of seismometer is the electromagnetic. This consists of a coil and a magnet, one rigidly fixed with respect to the earth and the other suspended from a fixed support by a spring. Any relative movement between the coil and magnet produces an electromotive force across the terminals of the coil which is proportional to the velocity of the motion.

Another type of electromagnetic geophone is so designed that earth motion causes variations in the width of an air gap, giving rise to corresponding changes in the reluctance of a magnetic current. Such changes can be converted into electrical oscillations by electromagnetic induction. This type of detector responds to velocity.

In the capacitive type of geophone, the inertia element is attached to one plate of a condenser, the other plate being fixed with respect to the earth. Motion of the ground varies the separation of the plates and hence the capacitance of the condenser. Output here is proportional to displacement if the natural frequency of the instrument is below the range of seismic frequencies to be recorded.

In the piezoelectric geophone a weight rests on a battery of plates made of some piezoelectric material such as quartz, tourmaline, or barium titanate. Any acceleration of the ground downward will decrease the apparent weight of the mass while acceleration upward will increase the pressure on the crystals. As the pressure changes, voltage variations are induced in the plates. Because it responds to pressure changes, this instrument measures accelerations rather than displacements or velocities.

Detectors used in marine work are the same in internal construction as those used on land, but their housing is modified. Pressure sensitive types generally prevail. Usually, they are mounted on gimbals to insure their being level and in proper position during shooting. The entire assemblage is often fitted into a streamlined housing, which is attached to an electrical cable connecting to the recording boat.

Seismic waves recorded by nearby detecting instruments take a great variety of paths, each requiring a different time to travel from shot to detector. Some of the waves are refracted and others are scattered; some waves will travel along the earth's surface, and others are reflected upward from various interfaces. The principal problem is to distinguish the reflections from the other events. There is no way of doing this with a single seismometer. However, when several closely spaced geophones are laid out along a line with the shot, the time relations between corresponding events on the traces from the respective geophones can be used to identify the reflections. The waves corresponding to a reflection will all line up across the record in such a way that the crests or troughs on adjacent traces will appear more or less to fit one another. The lining up may occur for a single wave cycle or for a train of several cycles depending on the nature of the reflecting surfaces within the earth and the characteristics of the recording instruments.

In practice, a trace almost always records the output of a group of seismometers connected in series or parallel in order to increase the effectiveness of the record. Thus, whatever the nature of their wave motion, noise events have one characteristic in common which differentiates them from reflections: they have substantially horizontal components while reflections travel in a predominantly vertical direction. By spreading out a number of geophones over a horizontal distance and recording their combined output as a single trace, the waveforms representing noise will tend to cancel each other while the reflected events are reinforced. A further result will be that weaker reflected signals will be discernable, or conversely, small initiating explosive charges may be employed to give equal efficiency in detecting reflecting layers It evident that although the use of a plurality of geophones at each station produces certain advantages, the practice adds to the time and labor involved for making each record, as well as to the invention cost. What is desired, obviously, is a single instrument which can be used to replace a plurality of geophones at a station. Several line-type detectors have been proposed which fulfill this purpose. A line detector in effect acts as an infinite number of geophones placed side by side and is capable of picking up an integrated signal representative of a true reflected wave front and to reject or cancel out spurious signals.

However, previously used line detectors have not proved too satisfactory. They generally have very limited sensitivity. They require special materials and fabrication techniques. They commonly employ magnetostrictive or piezo-electric elements which provide small voltages that must be amplified until they can perform useful functions. This need for amplification increases the complexity and cost of the devices and reduces their reliability. In addition, the characteristics of the elements make them unsuitable at very high frequency ranges. They generally are not adaptable for use in both terrestrial and marine seismic surveys. Further, the line detectors employed in offshore operations have by necessity been of rather large diameter. This causes considerable drag and slows down operating speed. Also, storage and handling problems are difficult.

It is, accordingly, the general object of the present invention to provide a single detector which will replace a plurality of conventional detectors at a receiving station and yet be sensitive, trouble-free, rugged, compact, versatile, and inexpensive.

A special object of this invention is to provide a novel line detector whose operation depends upon seismic vibrations producing detectable changes in the resistance to electric flow through the detector.

Another object is to provide a new and improved line detector which is responsive to pressure changes.

Another object is to provide a line detector which can be made to have a very small cross-sectional area.

Another object is to provide a line detector responsive to a wide range of frequencies.

Another object is to provide a detector which can be made any desired length without requiring the use of special materials and fabrication processes.

Another object is to provide a line detector which exhibits relatively high sensitivity over a wide frequency range.

Another object is to provide a line detector with a high output so that the required number of stages of electronic amplification can be reduced and even dispensed with in certain cases.

Another object is to provide a line detector in which the over-all electrical resistance of the device can readily be controlled and adjusted.

Another object is to provide a line detector having a fluid-inflatable inner chamber which can be used to control the response of the device to seismic vibrations.

Another object is to provide a detector of the line type which is suitable for use both offshore and on land.

Another object is to provide a line detector whose design and mode of operation renders same particularly useful for conducting offshore surveys.

The objects set forth above and others, which will be evident to those skilled in the art from the detailed description which follows, have been accomplished in the invention of a new type of line detector.

Referring now to the accompanying drawings.

Figure 1:
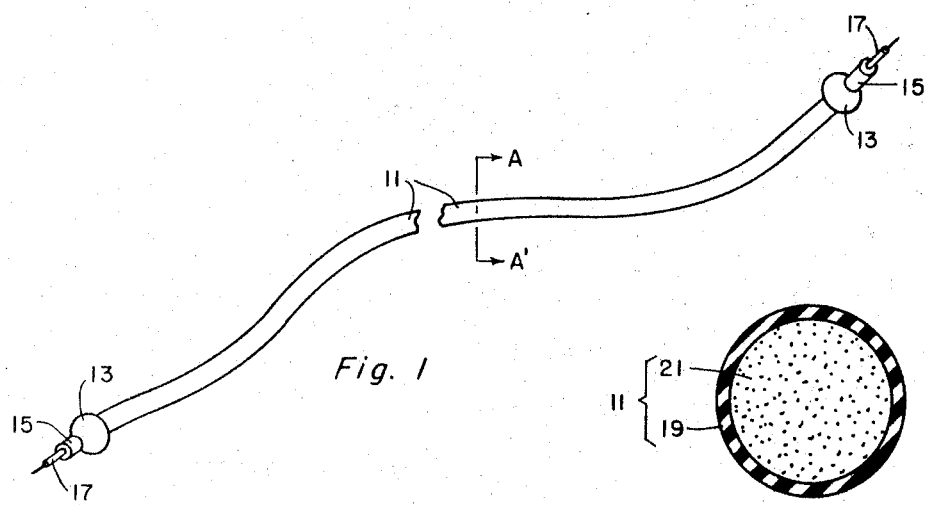
FIGURE 1 is a perspective view of the basic embodiment of the detector of this invention.

With specific reference to FIGURE 1, which shows the basic device in a perspective view, it will be seen that the line detector is constructed of a generally round, elongated, flexible body or trunk member 11 having rigid terminal members 13 joining on each end. Body member 11 of the detector extends to any desired length as indicated. Extending from terminals pieces 13 are sleeves or connectors 15. Sleeves 15 may be attached to terminals pieces 13 or be made integral therewith. Insulated leads 17 pass through sleeves 15 for connection with the remote ends of body portion 11.

Figure 2:
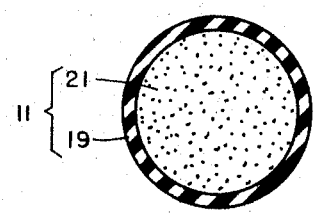
FIGURE 2 is a cross-sectional view of the device in FIGURE 1, taken along A–A'.

Referring now to FIGURE 2, a cross-sectional view of body portion 11 of the detector is shown composed of tube or container 19 having electric resistor material 21 contained therein. Tube 19 is made from a pliable material selected from a broad group of elastomers and thermoplastics which are good electrical insulators. For example, suitable elastomeric materials include silicon rubbers, polysulfide rubbers, butyl rubbers, etc. Prime examples of insulating thermoplastic materials are vinyl copolymers, polyesters, polyethylenes, polyamides, and the like. Electric resistor material 21 is a granular, preferably finely divided, solid having resistivity properties intermediate between conductors and insulators. Suitable solids include metals like carbon (e.g., conductive forms such as graphite, activated charcoal, etc.), iron, tin, lead, German silver, nickel-chromium alloys, copper-nickel alloys, iron-nickel alloys, etc., and semiconductors such as lead sulfide, silicon carbides, cuprous oxide, silicon, germanium, selinium, etc. Where desired, to control the sensitivity of the seismometer, etc., resistor material 21 can be mixed (diluted) with granular nonconducting solids or dispersed in a nonconducting liquid medium.

The device shown in FIGURE 1 is especially adapted for use in performing seismic surveys on land. Its operation is as follows: The detector is positioned on or just below the surface of the earth in the desired relationship to the source of seismic energy. A suitable voltage source (not shown) is connected across leads 17. Sound waves from the seismic source cause resistor elements 21 to compress and move apart so as to vary the electrical resistance through body member 11. This resistance change can be measured by well-known techniques such as by observing variations in a preselected electrical property of the system which is a function of the resistance, e.g., by observing variations in current flow through body portion 11 or change in voltage across same.

Figure 3:
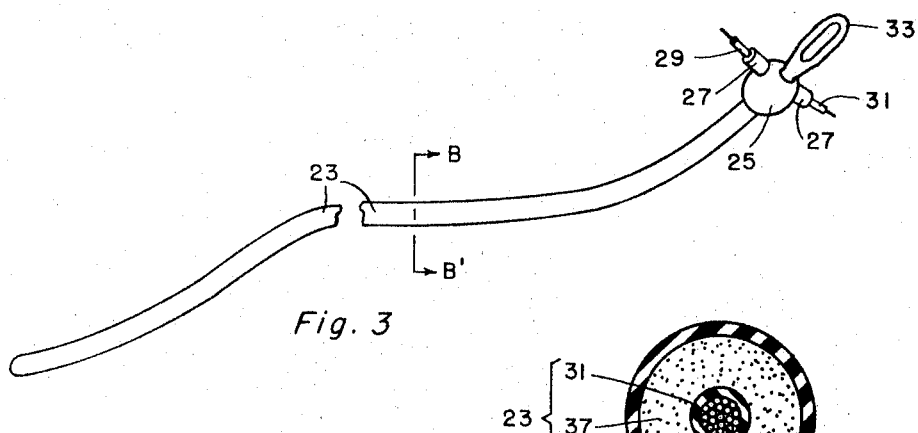
FIGURE 3 is a perspective view of a preferred embodiment of the detector of this invention.

FIGURE 3 is a perspective view showing a preferred embodiment for the line detector of this invention. Flexible body member 23 extends to any desired length, as indicated by the broken section, and has one end connecting with rigid head or terminal member 25. Sleeves 27 join head member 25 and carry insulated leads 29 and 31. Lead 29 makes electrical connection with body member 23 adjacent terminal member 25; lead 31 extends the length of body member 23 and electrically connects with the remote end thereof. Ring or attaching member 33 is firmly attached to head member 25 and may be an integral part thereof.

Figure 4:
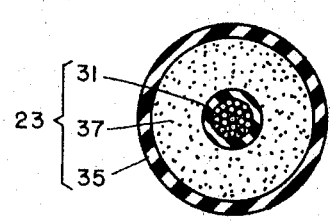
FIGURE 4 is a cross-sectional view of the device in FIGURE 3, taken along B–B'.

FIGURE 4 shows a cross-sectional view of the detector shown in FIGURE 3. Body member 23 is composed of flexible tube or container 35 which holds resistor material 37 and carries lead 31. Where desired, lead 31 may be located without tube 35 though still forming a part of body member 23. The particular embodiment illustrated in FIGURE 4 is to be preferred, however, because the line detector can be made more compact and also because less of resistor material 37 will be needed to fill tube 35. See supra for a detailed listing of suitable tube and resistor materials.

The line detector shown in FIGURE 3 is suited for use both on land and in offshore operations. When employed on land, it is used in the same manner as the device shown in FIGURE 1. Its use in seismic marine operations is as follows. Leads 29 and 31 are connected across a suitable voltage source (not shown). The detector is attached by means of ring 33 to a towing cable (not shown) and dragged through the water to proper shooting position. Preferably, the towing cable cuts the surface of the water instead of the seismometer so as to reduce background noise. Sound waves cause pressure changes in the water adjacent the detector causing resistor elements 37 to move inwardly or outwardly depending on the direction of the pressure change. The resistance to electrical flow through the seismometer will change as a function of the pressure.

Figure 5:
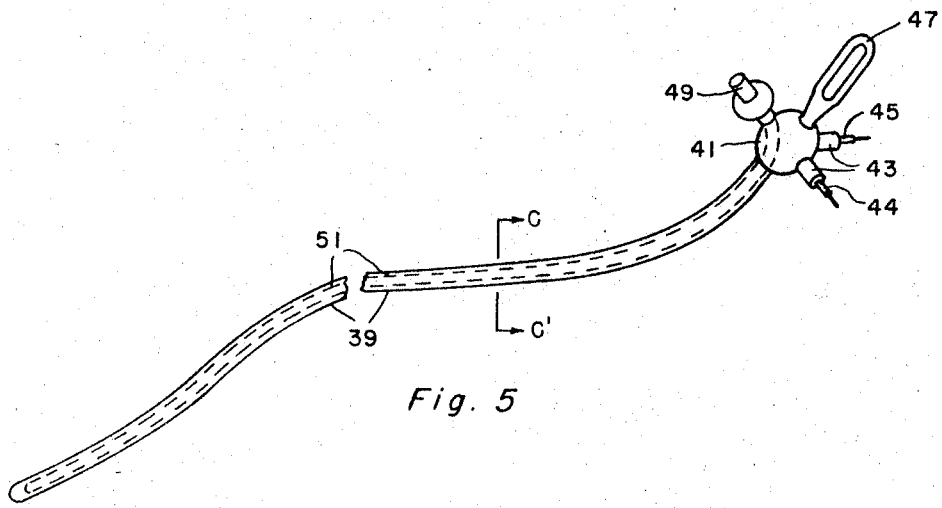
FIGURE 5 is a perspective view of a special embodiment of the detector of this invention.

FIGURE 5 shows a special embodiment of the present invention which has particular utility in bad record areas. Flexible body member 39 attaches to rigid head member 41. Connectors 43 connect to head member 41 and carry insulated leads 44 and 45. Lead 45 electrically connects with body member 39 adjacent terminal member 41. Lead 44 extends the length of body member 39 and makes electrical connection with the remote end of body member 39 to complete the circuit through same. Control valve 49 and attaching ring 47 also are fixed to head member 41. Inflatable tube 51, as indicated by the dashed lines, is contained with tube 39 and substantially extends longitudinal length thereof. Tube 51 joins to control valve 49 inside head member 41.

Figure 6:
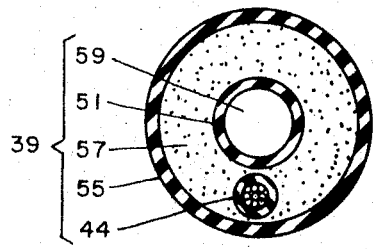
FIGURE 6 is a cross-sectional view of the device in FIGURE 5, taken along C–C'.

Referring now to FIGURE 6, which shows body member 39 in cross-section, inner tube 51 is inflated with fluid 59 and contained within tube 55. Resistor material 57 is shown packed between tubes 51 and 55. Insulated lead 44 is also shown between tubes 51 and 55, however, it may just as well be located within tube 51 or outside tube 55. Inner tube 51 is composed of a resilient, gas-impregnable, elastomeric material such as natural rubbers, neoprenes, butyl rubbers, etc. Fluid 59 can be a gas such as air, carbon dioxide, nitrogen, etc., or a liquid such as water, oil, etc. See the discussion relating to the device shown in FIGURE 1 for a listing of suitable materials for use in constructing tube 55 and selecting resistor elements 57.

The device shown in FIGURE 5 can be used for carrying out either terrestial or marine seismic surveys. Its mode of operation is similar to that as explained for the seisometer shown in FIGURE 3; however, its response to seismic vibrations can be controlled by means of inflatable tube 51. Prior to seismic operations tube 51 is inflated with fluid 59. As tube 51 expands, pressure is exerted on resistor elements 57. This allows initial adjustment of the electrical resistance through resistor elements 57. This control feature is most important where several line seismometers are used per shot since the responses (sensitivities) of the various seismometers should be adjusted to about the same level.

Now consider the detector of this invention in general terms and without regard to specific embodiments. In length, the line detector is conveniently constructed in 100-foot sections. Preferred operating lengths range from 300 to 600 feet. For special applications, sometimes a single detector will be 1200 or more feet in length. Minimum length is that length which is necessary for the detector to act as a continuous line of conventional geophones.

With respect to diameter, the present detector can be constructed to present a much smaller cross-sectional area than line detectors presently available. The preferred detectors have a diameter under one inch and usually on the order of one-half inch or less. Even though very small diameter detectors are now feasible and have important application (especially for offshore surveys), this invention is not limited to same and the basic principles disclosed herein can be used to build relatively large diameter detectors, i.e., ones with a diameter of 2 to 5 inches or more.

With respect to frequency response, the present detector responds to frequency ranges detected by conventional geophones, i.e., 10 to 100 cycles per second and also to very high frequencies, i.e., over about 300 cycles per second, to which prior art devices are generally insensitive. Further, the presently disclosed line detectors have very low natural frequencies of vibration and, therefore, seismic vibrations with very low frequency components can be detected.

With regard to voltage output, the electrical signal representing the seismic vibrations, requires few, if any, amplification stages. The disclosed detectors are very sensitive and the variations in resistance through the detector are easily detected and observed without the necessity of complicated and costly electronic equipment.

It will be understood, that various changes in the details, materials, and arrangements of parts which have been herein described and illustrated in order to explain the nature of the invention may be made by those skilled in the art and still be within the spirit and scope of the present invention. For instance, this invention may equally be important in a variety of other fields not connected with seismic exploration, e.g., the detection of water vehicles such as submarines by their generated noise.

Further, it is to be understood that the specific embodiments of the invention depicted in the foregoing description are by way of example only and not intended to limit the scope of invention, the same being limited only by the appended claims.

I claim:
1. A line seismometer comprising
    (a) an elongated flexible first tubular member composed of an electrically insulating material,
    (b) granular resistor elements substantially filling the void within said tubular member, said resistor elements carrying an electric current the resistance of which varies proportional to the energy of impinging seismic waves, and
    (c) a fluid-inflatable resilient second tubular member located within the confines of said first tubular member and extending substantially the length thereof for adjusting the packing of said resistor elements, thereby controlling the response of said resistor elements to said seismic waves.

2. A seismometer according to claim 1 where said seismometer forms a continuous line at least about 300 feet in length.

3. A seismometer according to claim 1 where said first tubular member has a diameter no greater than about one inch.

4. A seismometer according to claim 1 where an insulated electrical lead located between said first and second tubular members extends substantially the length of said seismometer.

References Cited by the Examiner

UNITED STATES PATENTS

| 2,171,793 | 9/1939  | Huth _____ 338—100 X |
| 2,465,696 | 3/1949  | Paslay _____ 340—7 X  |
| 2,772,405 | 11/1956 | Schurman et al. _____ 340—7 |
| 2,788,513 | 4/1957  | Howes _____ 340—7 X  |

References Cited by the Applicant

| 2,581,091 | 1/1952  | Foster.      |
| 2,649,579 | 8/1953  | Alexander.   |
| 2,735,303 | 2/1956  | Hasse.       |
| 2,965,877 | 12/1960 | Stein et al. |
| 3,075,170 | 1/1963  | Sorel.       |

BENJAMIN A. BORCHELT, *Primary Examiner.*

P. A. SHANLEY, *Assistant Examiner.*